US009448971B2

(12) United States Patent
Petri

(10) Patent No.: US 9,448,971 B2
(45) Date of Patent: Sep. 20, 2016

(54) CONTENT MANAGEMENT SYSTEM THAT RENDERS MULTIPLE TYPES OF DATA TO DIFFERENT APPLICATIONS

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 2102 days.

(21) Appl. No.: 11/875,204

(22) Filed: Oct. 19, 2007

(65) Prior Publication Data

US 2009/0106303 A1 Apr. 23, 2009

(51) Int. Cl.

| | |
|---|---|
| ***G06F 17/00*** | (2006.01) |
| ***G06F 17/20*** | (2006.01) |
| ***G06F 17/21*** | (2006.01) |
| ***G06F 17/22*** | (2006.01) |
| ***G06F 17/24*** | (2006.01) |
| ***G06F 17/25*** | (2006.01) |
| ***G06F 17/26*** | (2006.01) |
| ***G06F 17/27*** | (2006.01) |
| ***G06F 17/28*** | (2006.01) |

(52) U.S. Cl.
CPC .................................... *G06F 17/21* (2013.01)

(58) Field of Classification Search
USPC ........... 715/243, 204; 707/999.103, E17.001
See application file for complete search history.

(56) References Cited

U.S. PATENT DOCUMENTS

| | | | | |
|---|---|---|---|---|
| 7,103,850 | B1 * | 9/2006 | Engstrom et al. | 715/778 |
| 7,655,095 | B2 * | 2/2010 | Farrar | 438/906 |
| 8,046,698 | B1 * | 10/2011 | Chalfin et al. | 715/751 |
| 2004/0054659 | A1 * | 3/2004 | McIntyre | 707/3 |
| 2007/0276856 | A1 * | 11/2007 | Giannetti | 707/102 |
| 2007/0296993 | A1 * | 12/2007 | Bai | 358/1.13 |
| 2008/0155422 | A1 * | 6/2008 | Manico et al. | 715/731 |

OTHER PUBLICATIONS http://www.ptc.com/appserver/mkt/products/home.jsp?k=3591, pp. 1-2, printed Oct. 19, 2007.
http://www.invisionresearch.com/products/xpress, pp. 1-4, printed Oct. 19, 2007.
http://www.invisionresearch.com/products/spl/fda.htm, pp. 1-3, printed Oct. 19, 2007.
http://www.w3.org/MarkUp/Forms, pp. 1-5, printed Oct. 19, 2007.
http://www-306.ibm.com/software/lotus/forms, p. 1, printed Oct. 19, 2007.
http://xml.coverpages.org/healthcare.html, pp. 1-70, printed Oct. 19, 2007.

* cited by examiner

*Primary Examiner* — Manglesh M Patel
*Assistant Examiner* — Nicholas Hasty
(74) *Attorney, Agent, or Firm* — Martin & Associates, LLC; Derek P. Martin

(57) ABSTRACT

A content management system (CMS) includes a rendering mechanism that receives a desired rendering action for a selected object in the repository, determines from defined rendering rules which elements in the selected object correspond to the desired rendering action, determines which of a plurality of applications corresponds to the desired rendering action, and renders one or more elements in the selected object that correspond to the desired rendering action in the application corresponding to the desired rendering action. The rendering mechanism may insert rendering markers in an object that define a type of data for each element in the object. In addition, nested elements may be rendered by invoking multiple applications that are active at the same time to simultaneously render different types of data.

10 Claims, 15 Drawing Sheets

700

| Rendering Action | Type of Data | Editor | |
|---|---|---|---|
| StructuredEditAction | Structured | StructuredEditor | 710 |
| UnstructuredEditAction | Unstructured | UnstructuredEditor | 720 |
| AssembledEditAction | Assembly | AssemblyEditor | 730 |
| WizardEditAction | Wizard | WizardEditor | 740 |

FIG. 7

```
<document>
  <id root="f923849-239847-298749" />
  <title>
            GREAT DRUG
            <br />
            (TECHNICAL NAME OF GREAT DRUG)
            <br />
            TABLETS AND CHEWABLE TABLETS
            <br />
            <br />
            EXAMPLE DOCUMENT- NOT FOR MEDICAL REFERENCE
            <br />
  </title>
  <effectiveTime value="20021201" />
  <component>
    <section>
      <id root="f923849-239847-298749-321" />
      <subject>
        <manufacturedProduct>
          <manufacturedMedicine>
            <name>Great Drug</name>
            <formCode code="504" displayName="TABLET, FILM COATED" />
            <activeIngredient>
              <quantity>
                <numerator unit="mg" value="10" />
                <denominator value="1" />
              </quantity>
              <activeIngredientSubstance>
                <code code="TBD" codeSystem="1.2.3.4" codeSystemName="FDA" />
                <name>technical name</name>
                <activeMoiety>
                  <activeMoiety>
                    <code code="TBD" codeSystem="1.2.3.4" codeSystemName="FDA" />
                    <name>something</name>
                  </activeMoiety>
                </activeMoiety>
              </activeIngredientSubstance>
            </activeIngredient>
          </manufacturedMedicine>
        </manufacturedProduct>
      </subject>
    </section>
  </component>
```

— 1210 (title block)
— 1220 (section id)
— 1230 (activeIngredient block)

FIG. 12

```
 <component>
  <section>
   <id root="f2774a7f-fded-11d8-ae89-234223">
</id>
   <code code="34492-3" codeSystem="2.16.840.1.134221.6.1" codeSystemName=      1310
"LOINC" displayName="DESCRIPTION SECTION">
 </code>
   <title>DESCRIPTION</title>
   <text>
    <paragraph>
      GREAT DRUG was designed to relieve the common cold.
      <sup>&#174;</sup> <sup>*</sup> </paragraph>
    <paragraph>
      Great Drug is described chemically as [chemical description goes here.]
    </paragraph>
    <paragraph>
      The empirical formula is: formula goes here
    </paragraph>
    <paragraph>
      Each 10-mg film-coated GREAT DRUG tablet contains 10.4 mg of insert
      ingredient here.
    </paragraph>
    <paragraph>
      Each 4-mg and 5-mg chewable GREAT DRUG tablet contains 4.2 and 5.2 mg
      insert ingredient here, respectively. Chewable tablets contain the following inactive
      ingredients: name ingredients.
    </paragraph>
   </text>
   <component>
    <observationMedia ID="MM1">
     <value>
      <reference value="great-drug-01.jpg" />
     </value>
    </observationMedia>
   </component>                                     1320
   <component>
    <observationMedia ID="MM2">
     <value>
      <reference value="great-drug-02.jpg" />
     </value>
    </observationMedia>
   </component>
  </section>
 </component>
</document>
```

```
<RenderingRules>
        <RuleGroup>
                <Condition operator="IN" systemRoleRef="regulatory_contributor">
                        <Value constant="CURRENT_USER_GROUPS" />
                </Condition>
                <Rule match="/document/component/section[child::text]" type="unstructured">
                        <Action name="UnstructuredEditAction" />
                </Rule>
                <Rule match="/document/component/section[child::text]/id"type="structured" />
                <Rule match="/document/component/section[child::text]/code"type="structured"/>
                <Rule match="/document/component/section[child::text]/title"type="structured" />
        </RuleGroup>
        <Default type="structured">
                <Condition type="content" operator="EQ">
                        <Value constant="SKELETON" />
                </Condition>
                <Action name="StructuredEditAction" />
        </Default>
</RenderingRules>
```

```
<DataMapping>
        <Data type="structured">
                <Action name="StructuredEditAction" />
        </Data>
        <Data type="unstructured">
                <Action name="UnstructuredEditAction" />
        </Data>
        <Data type="assembled">
                <Action name="AssembledEditAction" />
        </Data>
</DataMapping>
```

FIG. 15

```xml
<?score defaultRenderActions="StructuredEditAction"?>         ←— 1610
<document>
 <id root="f923849-239847-298749" />
 <code code="23948-4" codeSystem="3.41.2983.1.298988.6.2" codeSystemName="LOINC" displayName="Human prescription drug label" />
 <title>
              GREAT DRUG
              <br />
              (TECHNICAL NAME OF GREAT DRUG)
              <br />
              TABLETS AND CHEWABLE TABLETS
              <br />
              <br />
              EXAMPLE DOCUMENT- NOT FOR MEDICAL REFERENCE
              <br />
 </title>
 <effectiveTime value="20021201" />
 <component>
  <section>
   <id root="f923849-239847-298749-321" />
   <subject>
    <manufacturedProduct>
     <manufacturedMedicine>
      <name>Great Drug</name>
      <formCode code="504" displayName="TABLET, FILM COATED" />
      <activeIngredient>
       <quantity>
        <numerator unit="mg" value="10" />
        <denominator value="1" />
       </quantity>
       <activeIngredientSubstance>
        <code code="TBD" codeSystem="1.2.3.4" codeSystemName="FDA" />
        <name>technical name</name>
        <activeMoiety>
         <activeMoiety>
          <code code="TBD" codeSystem="1.2.3.4" codeSystemName="FDA" />
          <name>something</name>
         </activeMoiety>
        </activeMoiety>
       </activeIngredientSubstance>
      </activeIngredient>
     </manufacturedMedicine>
    </manufacturedProduct>
   </subject>
  </section>
 </component>
```

FIG. 16

```xml
<component>
  <section>
    <?score renderActions="UnstructuredEditAction"?>         ← 1710
<id root="f2774a7f-fded-11d8-ae89-234223">
    <?score renderActions="StructuredEditAction"?> </id>     ← 1720
    <code code="34492-3" codeSystem="2.16.840.1.134221.6.1" codeSystemName="LOINC" displayName="DESCRIPTION SECTION">
    <?score renderActions="StructuredEditAction"?> </code>   ← 1730
    <title><?score renderActions="StructuredEditAction"?>DESCRIPTION</title> ← 1740
    <text>
      <paragraph>
        GREAT DRUG was designed to relieve the common cold.
        <sup>®</sup> <sup>*</sup> </paragraph>
      <paragraph>
        Great Drug is described chemically as [chemical description goes here.]
      </paragraph>
      <paragraph>
        The empirical formula is: formula goes here
      </paragraph>
      <paragraph>
        Each 10-mg film-coated GREAT DRUG tablet contains 10.4 mg of insert ingredient here.
      </paragraph>
      <paragraph>
        Each 4-mg and 5-mg chewable GREAT DRUG tablet contains 4.2 and 5.2 mg insert ingredient here, respectively. Chewable tablets contain the following inactive ingredients: name ingredients.
      </paragraph>
    </text>
    <component>
      <observationMedia ID="MM1">
        <value>
          <reference value="great-drug-01.jpg" />
        </value>
      </observationMedia>
    </component>
    <component>
      <observationMedia ID="MM2">
        <value>
          <reference value="great-drug-02.jpg" />
        </value>
      </observationMedia>
    </component>
  </section>
</component>
</document>
```

FIG. 17

CONTENT MANAGEMENT SYSTEM THAT RENDERS MULTIPLE TYPES OF DATA TO DIFFERENT APPLICATIONS

BACKGROUND

1. Technical Field

This disclosure generally relates to content management systems, and more specifically relates to rendering of content in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content.

A content management system typically manages documents (also referred to as objects) in a specified format, such as eXtensible Markup Language (XML). An XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification promulgated by the International Conference on Harmonization of Technical Requirements (ICH)). A given XML document may also be associated with additional artifacts such as a document type definition (DTD), XSL style sheets, and other associated files, tools and utilities. XML data may be of different types, such as structured data, unstructured data, assembled data, and wizard data. Structured data is very structured, similar to relational data, and there is no unstructured data mixed in within the well-defined structure. Unstructured data is like traditional rich word processing formats, such as Microsoft Word. Microsoft and Word are registered trademarks of Microsoft Corporation. Assembled data represents a structure of links to external content. Wizard data is a special form of tabular data that uses a wizard to prompt the user to provide the data that is inserted into a table or other data structure. A given document may contain a mix of different types of data. Known applications such as applications for rendering different types of data are efficient and able to render certain types of data well, but not others. For example, an application such as Microsoft Word may be efficient in rendering unstructured data, but poor at rendering structured data. When a user decides to invoke a particular application to view a document that contains multiple types of data, the application may do a good job with respect to some types of data while doing a poor job with respect to other types of data in the same document. It is often difficult for a user to know which application to use when viewing a document with multiple types of data. Without a way for a content management system to render an object with different data types in a more efficient way, a user will have to manually switch applications when working with different types of data in an object.

BRIEF SUMMARY

A content management system (CMS) includes a rendering mechanism that receives a desired rendering action for a selected object in the repository, determines from defined rendering rules which elements in the selected object correspond to the desired rendering action, determines which of a plurality of applications corresponds to the desired rendering action, and renders one or more elements in the selected object that correspond to the desired rendering action in the application corresponding to the desired rendering action. The rendering mechanism may insert rendering markers in an object that define a type of data for each element in the object. The rendering mechanism may then determine from the desired rendering action and from the rendering markers in the object which elements in the selected object should be rendered, and which application should be used to render the elements. In addition, nested elements may be rendered by invoking multiple applications that are active at the same time to simultaneously render different types of data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a block diagram of a table showing correlation between rendering actions, type of data to be rendered, and editors;

FIG. 12 shows the first portion of a sample XML document;

FIG. 13 shows the remaining portion of the sample XML document of FIG. 12;

FIG. 14 shows a sample set of rendering rules;

FIG. 15 shows a sample data mapping to specify a default action for each data type;

FIG. 16 shows the first portion of the sample XML document in FIG. 12 after rendering markers have been placed in elements in the document;

FIG. 17 shows the remaining portion of the sample XML document of FIG. 16 after rendering markers have been placed in elements in the document;

DETAILED DESCRIPTION

The claims and disclosure herein provide a content management system (CMS) that renders different elements in an object to different applications.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
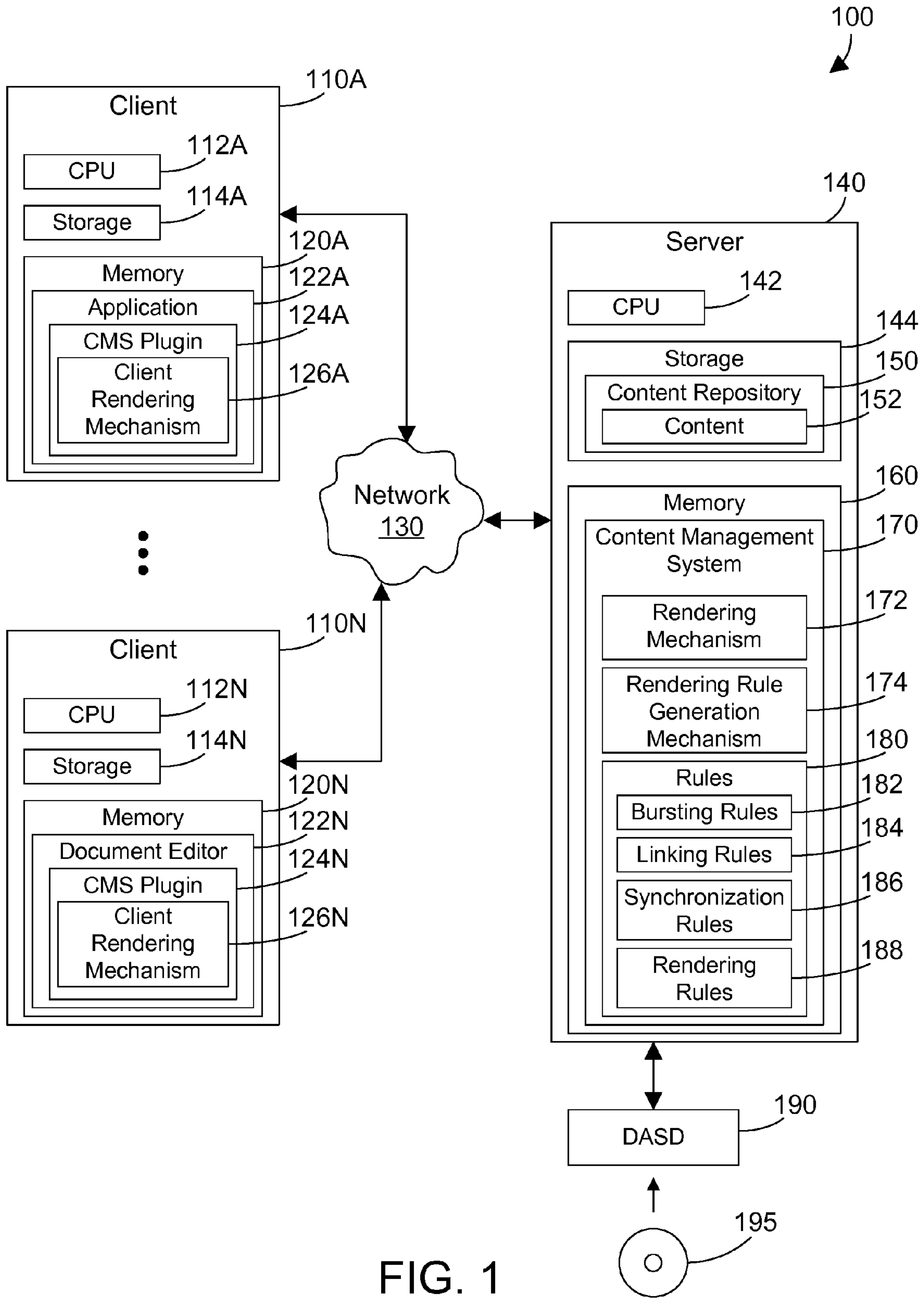
FIG. 1 is a block diagram of a networked computer system that includes a server computer system that has a content management system that includes a rendering mechanism that renders different elements using different applications.

Referring to FIG. 1, networked computer system 100 includes multiple clients, shown in FIG. 1 as clients 110A, . . . , 110N, coupled to a network 130. Each client preferably includes a CPU, storage, and memory that contains a document application and a content management system (CMS) plugin. Thus, client 110A includes a CPU 112A, storage 114A, memory 120A, a document application 122A in the memory 120A that is executed by the CPU 112A, and a CMS plugin 124A that allows the document application 122A to interact with content 152 in the repository 150 that is managed by the CMS 170 in server 140. The CMS plugin 124A includes a client rendering mechanism 126A that allows the client to render different types of data within an object via different applications. In similar fashion, other clients have similar components shown in client 110A, through client 110N, which includes a CPU 112N, storage 114N, memory 120N, a document application 122N, a CMS plugin 124N, and a client rendering mechanism 126N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system.

CMS 170 includes a rendering mechanism 172, a rendering rule generation mechanism 174 and rules 180. Rendering mechanism 172 is used to render different elements in an object to different applications. One way rendering mechanism keeps track of elements in an object is to insert rendering markers in the elements to define a rendering action corresponding to the element. The rendering action may then be correlated to a corresponding application. This allows the rendering mechanism 172 to render elements in an object via an application that can render the elements effectively. Rules 180 include bursting rules 182, linking rules 184, synchronization rules 186, and rendering rules 188. Of course, other rules, whether currently known or developed in the future, could also be included in rules 180. Rendering rule generation mechanism 174 is used to automatically generate new rendering rules 188 when new rendering rules need to be generated.

Bursting rules 182, linking rules 184, and synchronization rules 186 are well-known in the art. Rendering rules 188 are introduced herein, and contain information that tells the rendering mechanism 172 how to render elements in an object. For example, if an object contains elements of structured data, the rendering rules may indicate which application should be used to render that data.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The rendering mechanism and the rendering rule generation mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
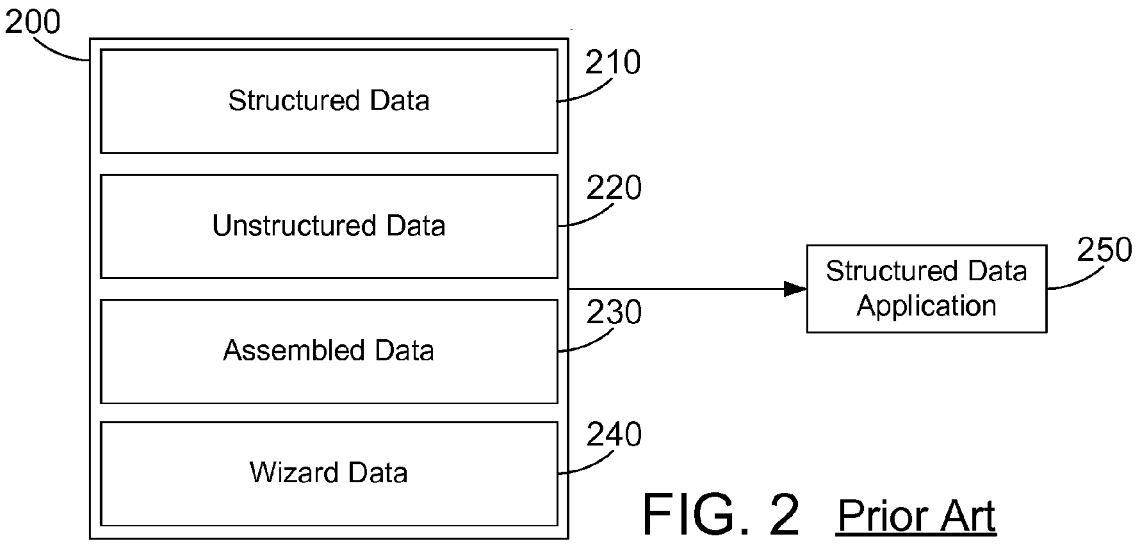
FIG. 2 is a block diagram of a prior art system for rendering data with a structured data application.
Figure 3:
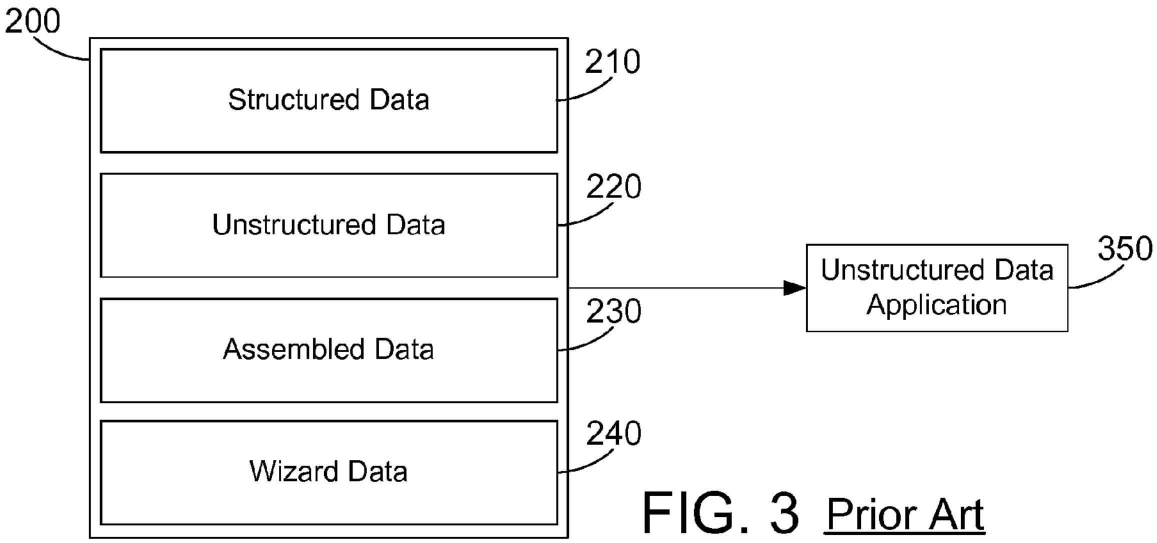
FIG. 3 is a block diagram of a prior art system for rendering data with an unstructured data application.
Figure 4:
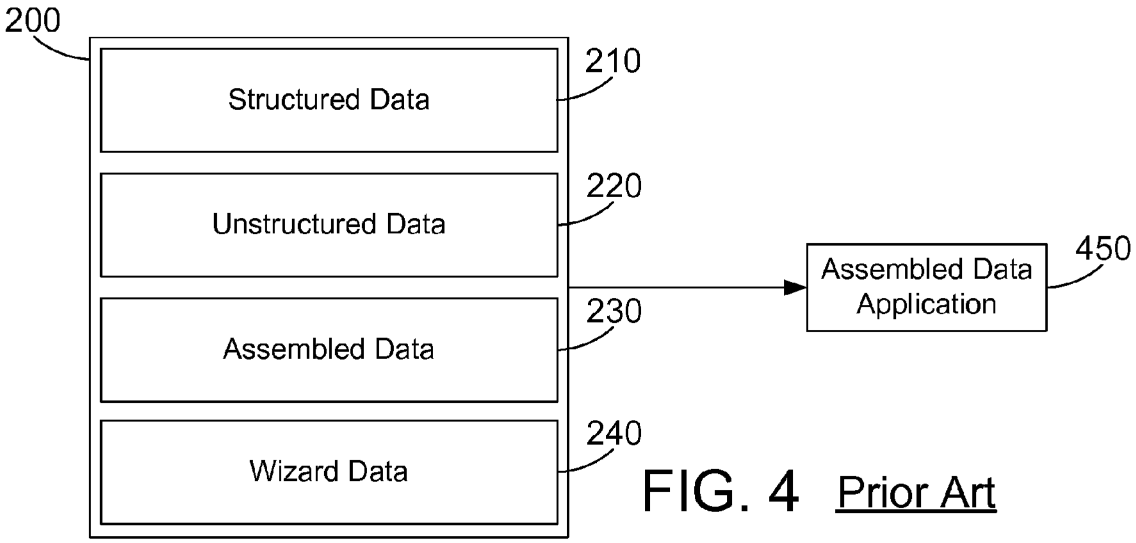
FIG. 4 is a block diagram of a prior art system for rendering data with an assembled data application.
Figure 5:
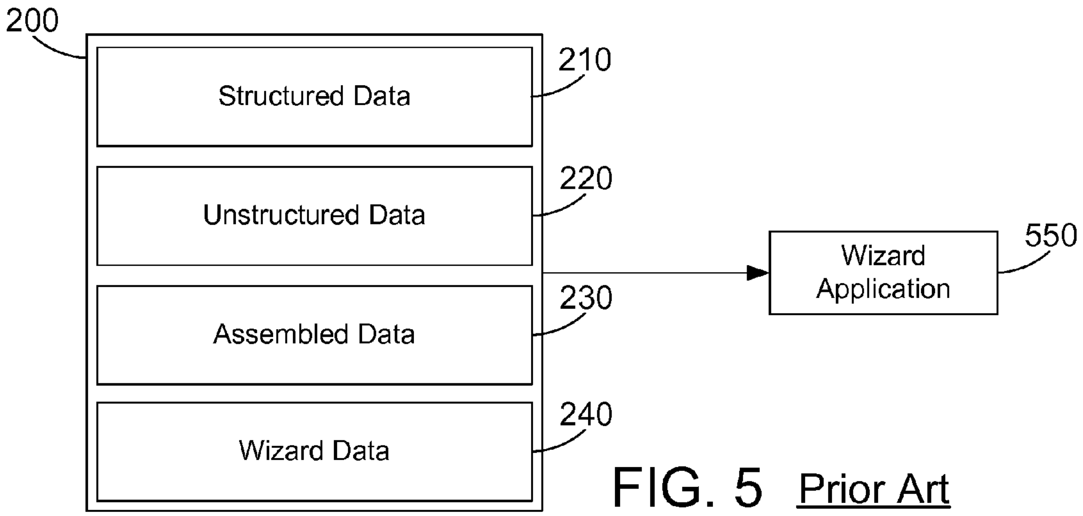
FIG. 5 is a block diagram of a prior art system for rendering data with a wizard application.

FIGS. 2-5 show block diagrams of how an object in a content management system is rendered in the prior art. An object 200 can have multiple elements in different forms shown as structured data 210, unstructured data 220, assembled data 230, and wizard data 240. FIG. 2 shows object 200 being rendered using structured data application 250. Structured data application 250 is efficient at rendering structured data. Notice that structured data 210, unstructured data 220, assembled data 230, and wizard data 240 are all rendered with structured data application 250. This can cause undesired results as structured data application 250 may not be able to render unstructured data 220, assembled data 230, and wizard data 240 in an acceptable manner. FIGS. 3-5 show the same object 200 being rendered by unstructured data application 350, assembled data application 450, and wizard data application 550 respectively. In the prior art, the user typically selects a single application to use, and the object is then rendered to the user using this single application. Because each application is optimized for rendering a specific kind of content, rendering other kinds of content in the same application may produce undesirable results.

Figure 6:
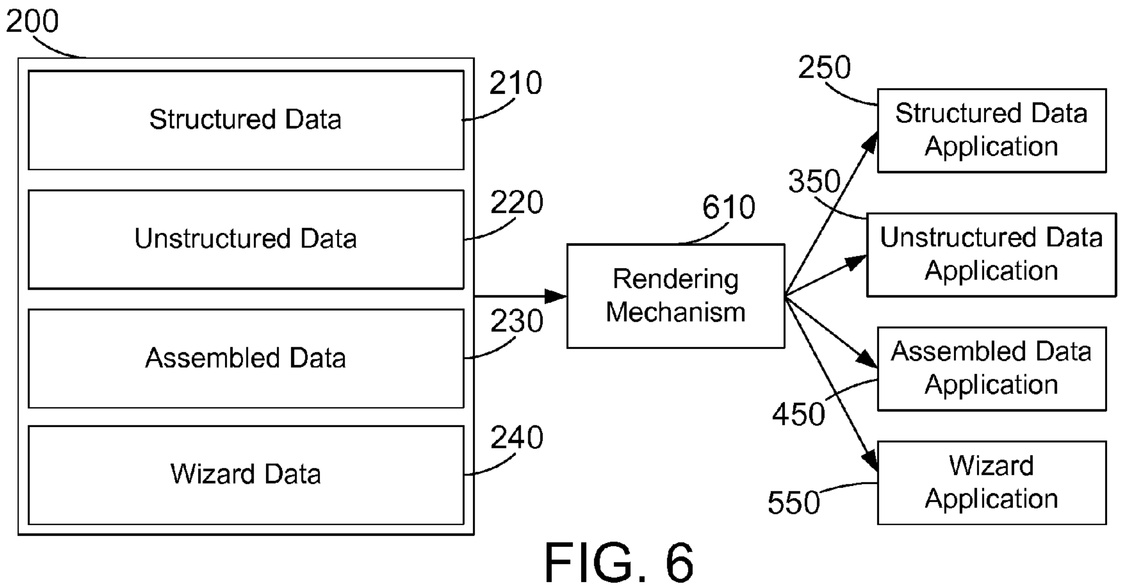
FIG. 6 is a block diagram of a system for rendering data of different types to different applications depending on the type of data being rendered.

Referring to FIG. 6, the same object 200 may be processed using a single rendering mechanism 610. Rendering mechanism 172 and client rendering mechanism 126A, . . . , 126N are suitable examples for rendering mechanism 610. Rendering mechanism 610 renders elements in object 200 to the corresponding application. For example, structured data 210 is rendered using structured data application 250, unstructured data 220 is rendered using unstructured data application 350, assembled data 230 is rendered using assembled data application 450, and wizard data 240 is rendered using wizard data application 550. In a first implementation, a single application is selected based on the desired rendering action. In a second implementation, multiple applications are invoked at the same time to render different parts of an object to at the same time, such as a nested object that include multiple types of data.

Rendering mechanism 610 could render the data in a variety of ways. One suitable implementation is to have a user choose which application to run, and then only the elements of object 200 that correspond to the chosen application would be rendered in the application. For example, if the user chose to run structured data application 250, only elements within structured data 210 would be rendered to the structured data application 250. The presence of other elements (i.e. unstructured data 220, assembled data 230, and wizard data 240) could be denoted in the display of the structured data application 250 with different symbols or colors, but those elements may not be rendered in the structured data application 250.

Figure 20:
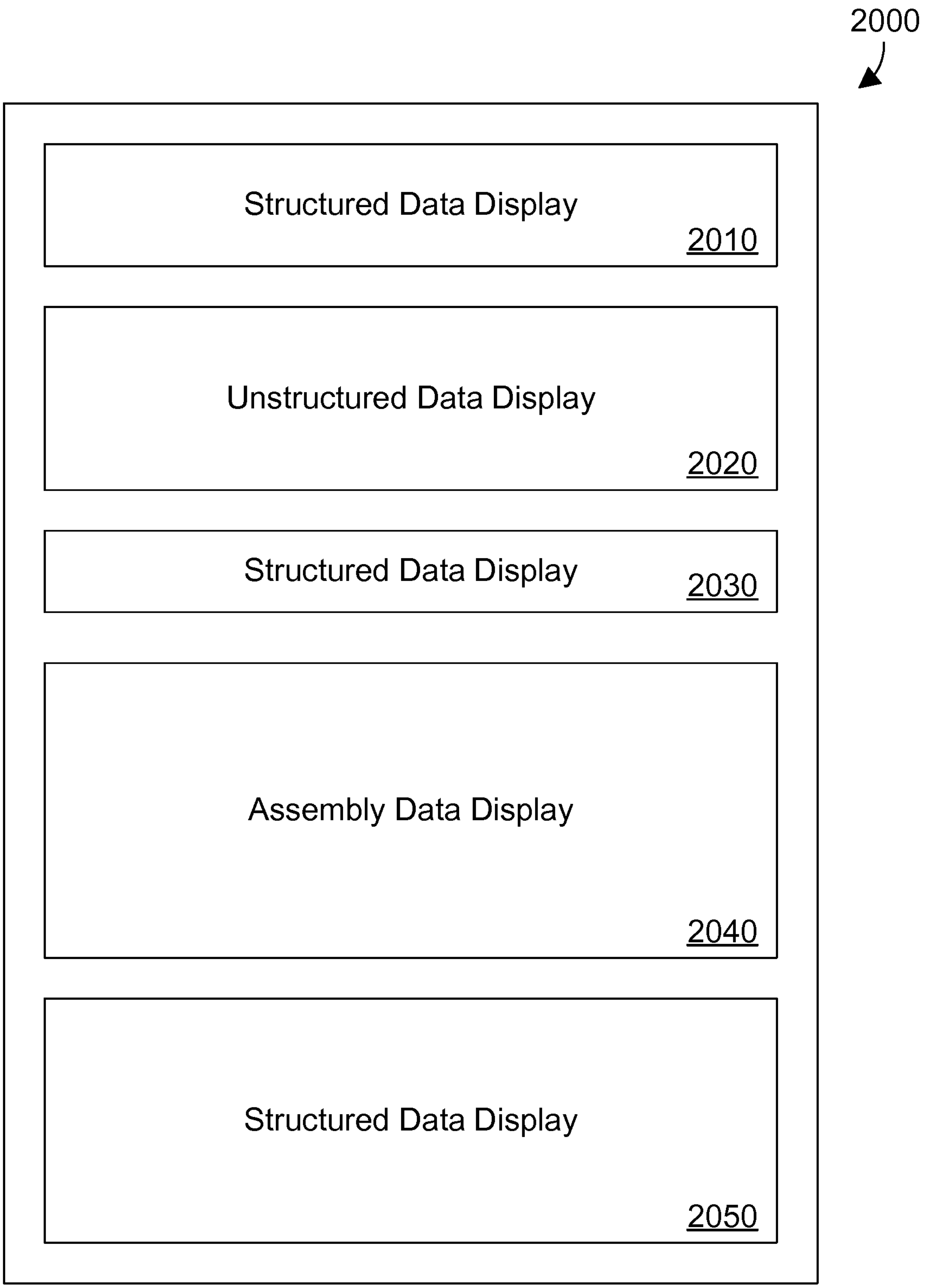
FIG. 20 is a block diagram showing simultaneous display from multiple editors in a graphical user interface.

Another suitable implementation is to launch an application for each element or type of data in object 200 and have a graphical user interface combine them all together. For example, let's assume an object 200 contains ten elements in the following order: two unstructured data, one structured data, three assembled data, two wizard data, one unstructured data, and one structured data. When rendering mechanism 610 renders this object, it may invoke three instances of an unstructured data application, two instances of a structured data application, three instances of an assembled data application, and two instances of a wizard data application. All of these applications could be active at the same time, and the user interface could arrange the display from the applications to represent the layout of object 200 which would allow the user to get an overall picture of object 200 by rendering the individual elements using applications that are best suited to elements of that type. FIG. 20 shows an example of a graphical user interface that displays the output of multiple applications to a user.

Figure 8:
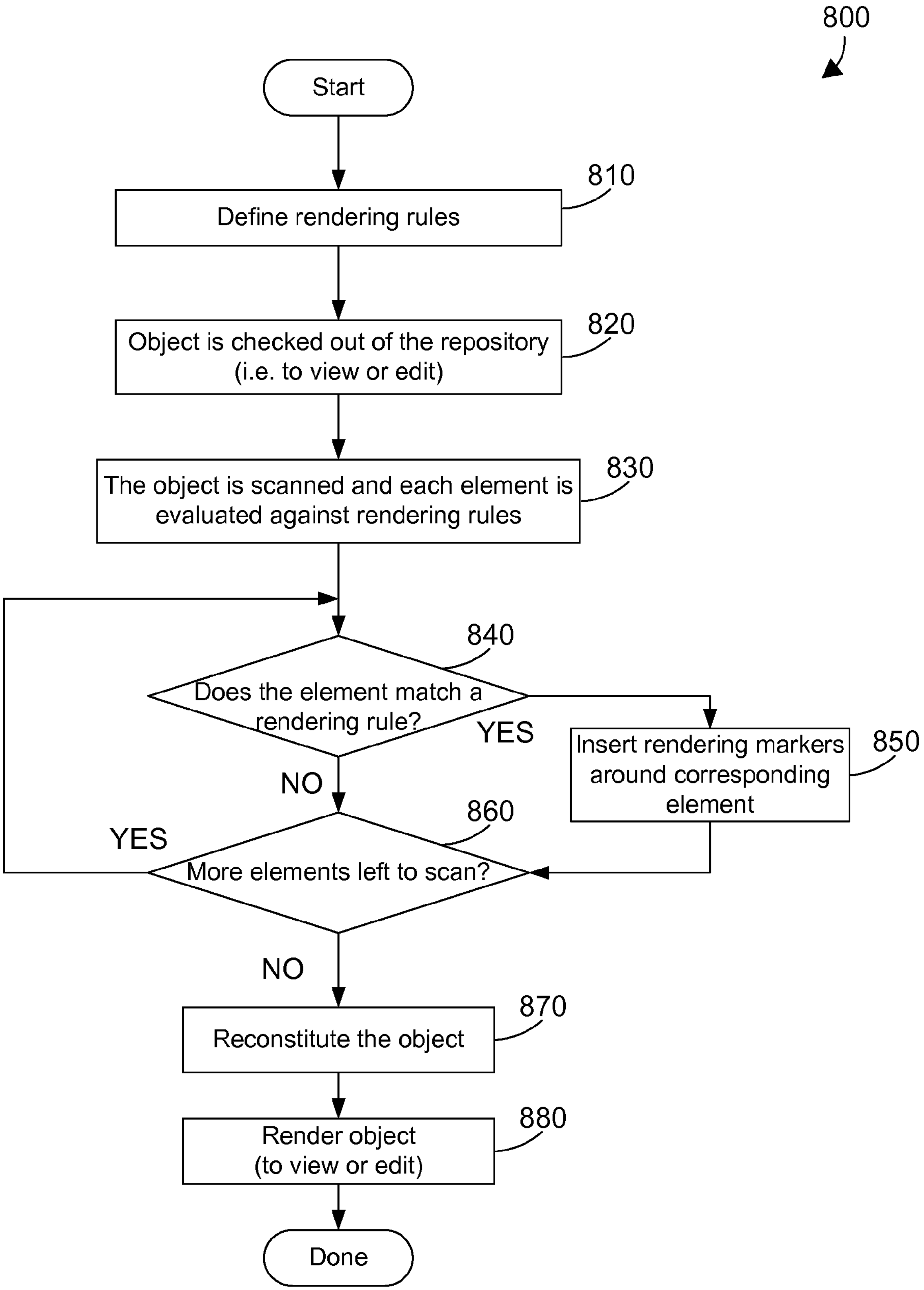
FIG. 8 is a flow diagram of a method for inserting rendering markers in elements in an object.

Referring to FIG. 7, a table 700 shows a correlation between rendering actions, type of data in an object, and a corresponding application used to render elements of that type of data. For this simple example, we assume an action StructuredEditAction corresponds to structured data, which is rendered using a StructuredEditor as shown at 710. An action UnstructuredEditAction corresponds to unstructured data, which is rendered using an UnstructuredEditor as shown at 720. An action AssembledEditAction corresponds to assembly data, which is rendered using an AssemblyEditor as shown at 730. An action WizardEditAction corresponds to wizard data, which is rendered using a WizardEditor as shown at 740. Note the labels in FIG. 7 are descriptive, but allow an understanding of how specifics could be implemented. For example, entry 710 could include a rendering action of Edit eCTD Properties as the rendering action, structured as the type of data, and an editor of eCTD Editor. Note eCTD stands for Electronic Common Technical Document, which is an example of a specialized grammar for structured data. Entry 720 could include Edit( ) as the rendering action, unstructured as the type of data, and Microsoft Word as the editor. One of ordinary skill in the art will recognize the entries in table 700 in FIG. 7 could be replaced with any suitable rendering action, type of data, and corresponding application. Referring to FIG. 8, a method 800 scans an object and inserts rendering markers in elements in the object that correspond to defined rendering rules. Method 800 begins with defining rendering rules (step 810), such as when a system administrator manually defines one or more rendering rules. An object is then checked out of the repository (step 820), and the object is scanned and each element is evaluated against the rendering rules (step 830). If the element matches a rendering rule (step 840=YES), a rendering marker is inserted in the corresponding element (step 850). If there are more elements left to scan (step 860=YES) method 800 goes to step 840. If the element does not match a rendering rule (step 840=NO) then method 800 goes to step 860. If there are no more elements that need to be scanned (step 860=NO) the object is reconstituted (step 870) and the object is rendered to view or edit (step 880).

Figure 9:
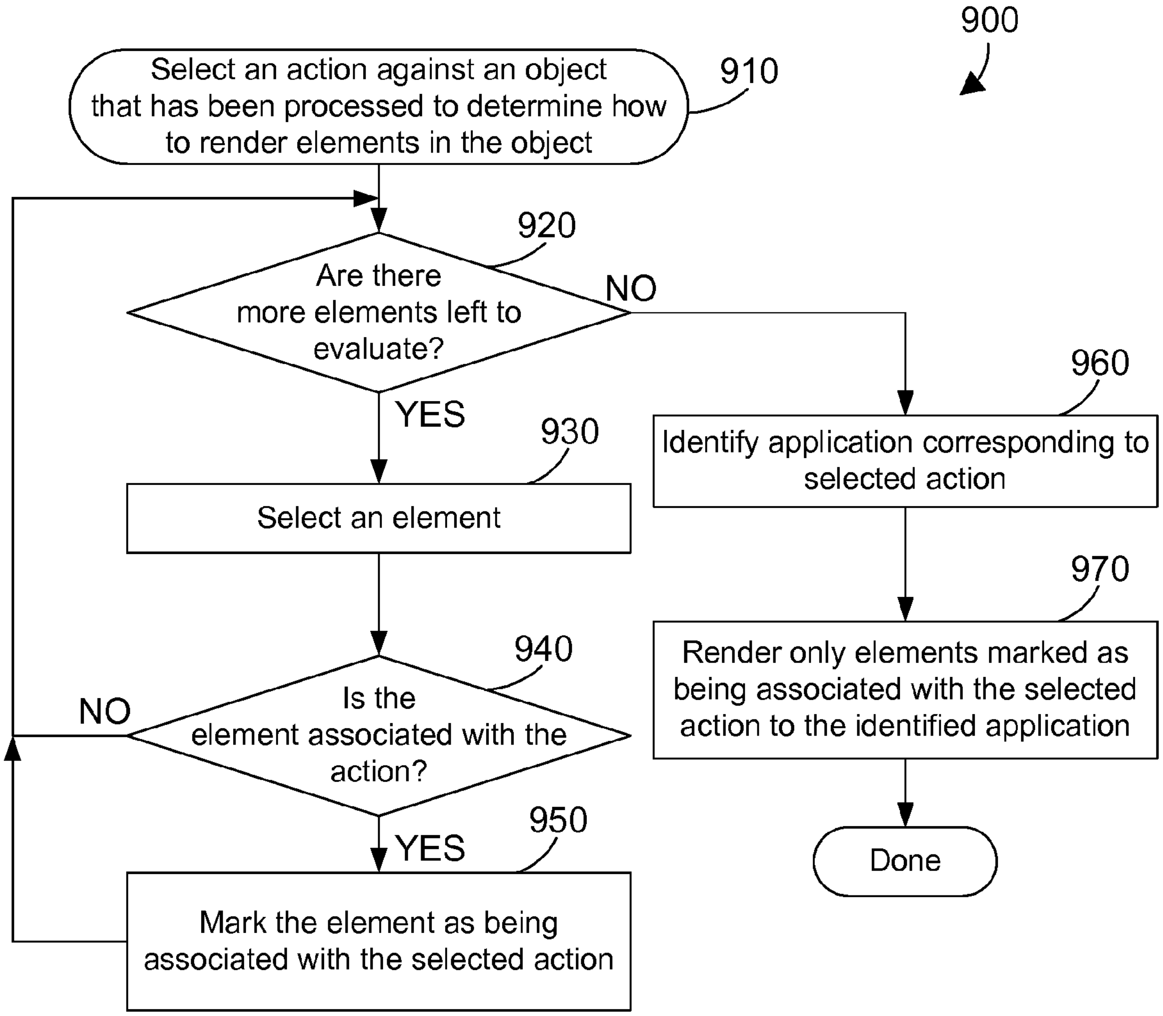
FIG. 9 is a flow diagram of a method for rendering only elements associated with a selected action to a corresponding editor.

Referring to FIG. 9, a method 900 for rendering only elements associated with a specified action begins with selecting a desired action against an object that has been processed to determine how to render elements in the object (step 910). If there are more elements to evaluate (step 920=YES), an element is selected (step 930). If the element is associated with the selected action (step 940=YES) the element is marked as being associated with the selected action (step 950) and method 900 returns to step 920. If the element is not associated with the selected action (step 940=NO) method 900 returns to step 920. If there are no more elements left to evaluate (step 920=NO), an application corresponding to the selected action is identified (step 960), and only the elements marked as being associated with the selected action are rendered to the identified application (step 970). Method 900 discloses invoking a single application, and rendering to the single application only those elements that correspond to the type of data the single application is optimized for. Note, however, that the disclosure and claims herein expressly extend to rendering multiple types of data to multiple applications that are active at the same time, as shown in FIG. 20.

Figure 10:
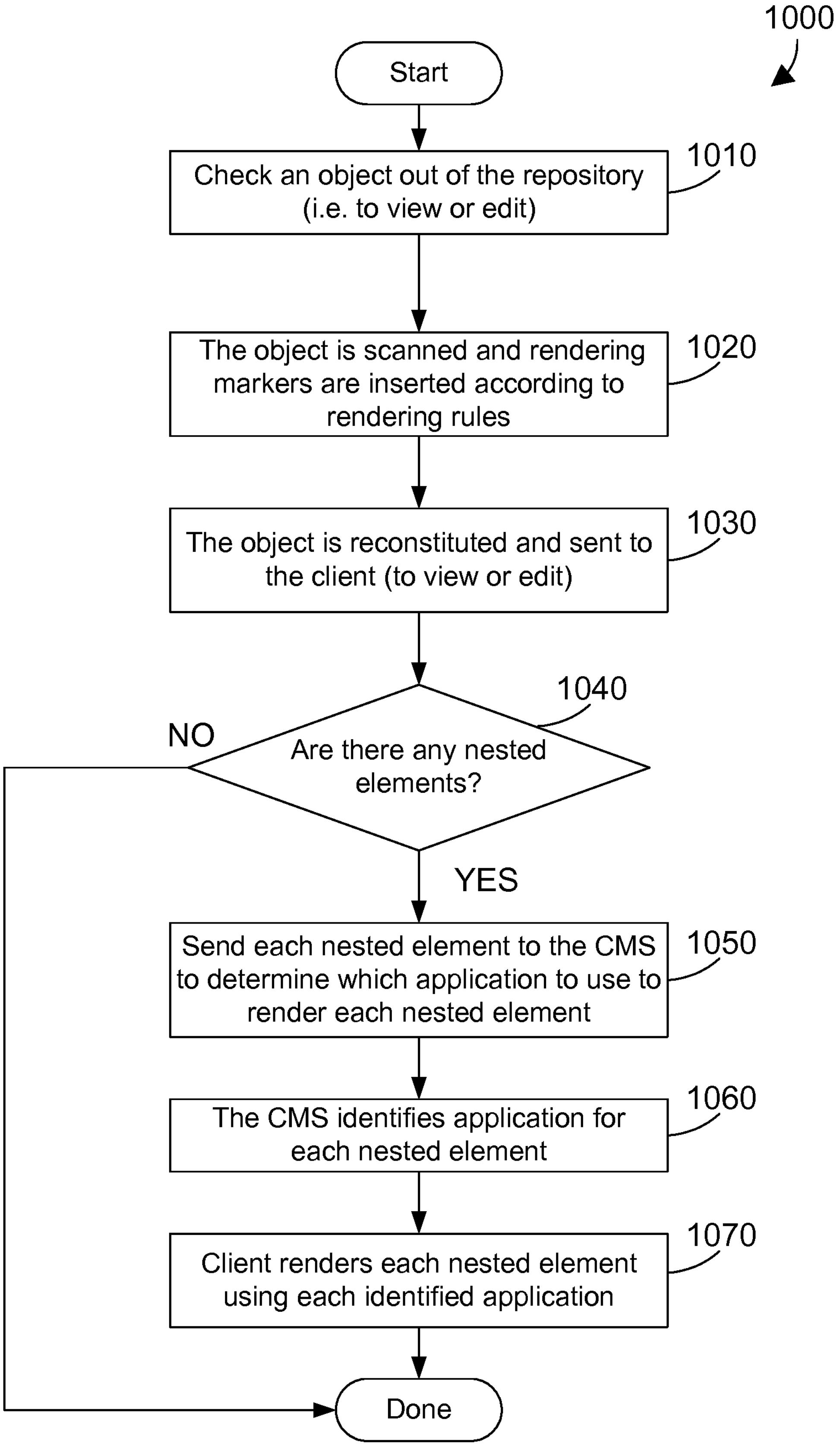
FIG. 10 is a flow diagram of a method for the content management system to handle nested elements in an object.

Nested elements in an object may be handled by either calling the CMS, or by allowing a client rendering mechanism (e.g., 126A in FIG. 1) to handle the nested elements without calling the CMS. Referring to FIG. 10, a method 1000 for the content management system to handle nested elements in an object begins with checking an object out of the repository (step 1010). The object is scanned and one or more rendering markers are inserted according to rendering rules (step 1020). The elements marked in step 1020 may include nested elements. The object is then reconstituted and sent to the client to view or edit (step 1030). If there are any nested elements (step 1040=YES), each nested element is sent to the CMS to determine which application to use to render each nested element (step 1050). In response, the CMS identifies which application to use for each nested element (step 1060). The client then renders each nested element using each identified application (step 1070) and method 1000 is done. If there are no nested elements (step 1040=NO) then method 1000 is done.

Figure 11:
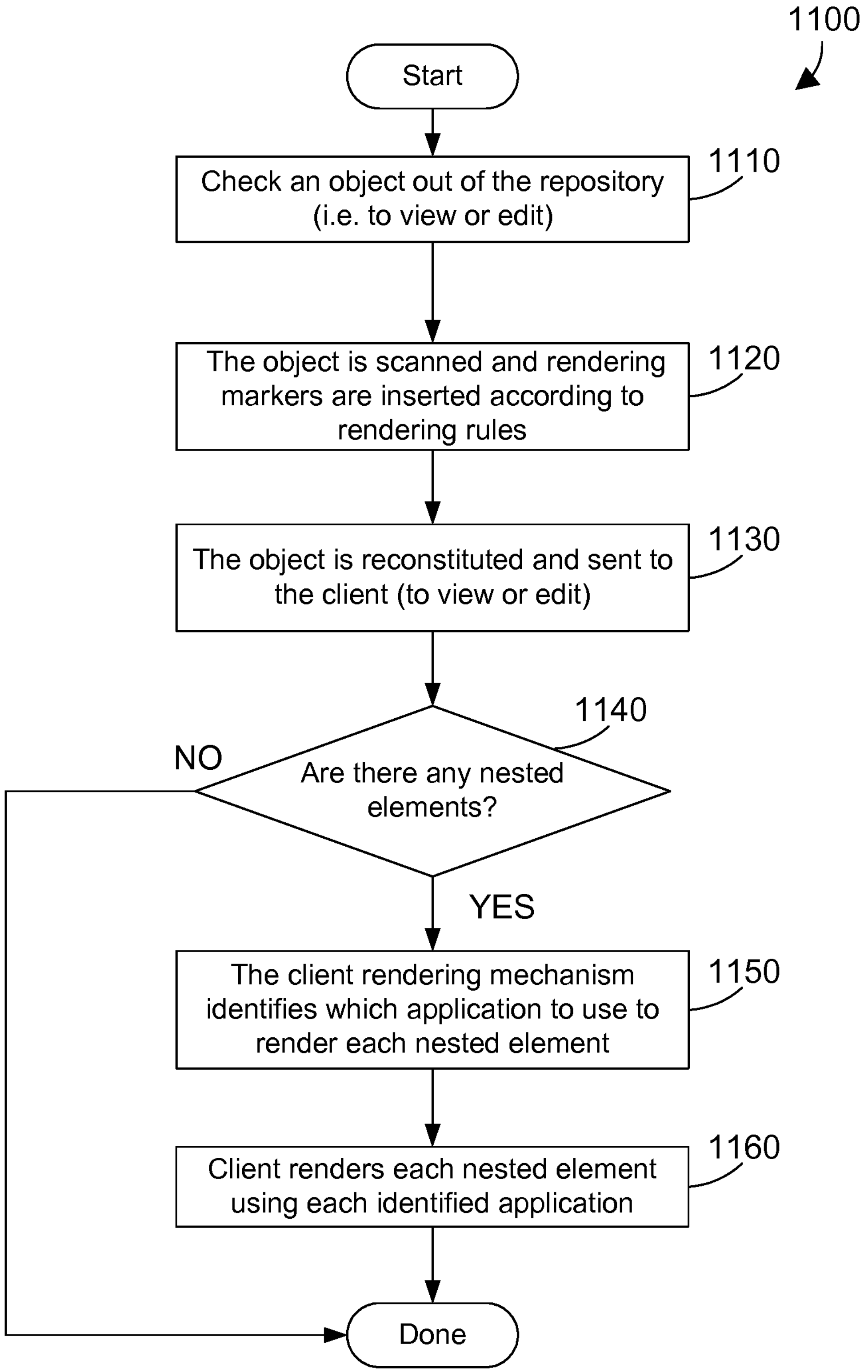
FIG. 11 is a flow diagram of a method for a client to handle nested elements in an object.

Referring to FIG. 11, a method 1100 allows a client to handle nested elements in an object without calling the CMS, and begins with checking an object out of the repository (step 1110). The object is scanned and one or more rendering markers are inserted according to rendering rules (step 1120). The elements marked in step 1120 may include nested elements. The object is then reconstituted and sent to the client to view or edit (step 1130). If there are any nested elements (step 1140=YES) the client rendering mechanism identifies which application to use to render each nested element (step 1150). One suitable way for the client to identify which application to use is for the client to receive a copy of the rendering rules (188 in FIG. 1) from the CMS. The client then renders each nested element using each identified application (step 1160) and method 1100 is done. If there are no nested elements (step 1140=NO) then method 1100 is done.

A simple example is now given to illustrate the methods herein. A user starts with a sample XML document based on a drug labeling grammar as shown in FIGS. 12-13. The sample XML document shown in FIGS. 12-13 contains structured data 1210, 1220 and 1230 in FIGS. 12 and 1310 and 1320 in FIG. 13. We assume for this example all other parts of the object represent unstructured data. A sample set of rendering rules 1400 is shown in FIG. 14. Multiple rules can be grouped under a RuleGroup element as seen in rendering rules 1400, allowing a list of rules to share the same set of conditions. One or more conditions may be specified for a rule group to determine when the rules should be enforced. For example, rule group 1410 will only be enforced when the user is in the "regulatory_contributor" role. Rule 1420 matches <section> elements that contain at least one <text> element. A rule also specifies the type of data that the matching element represents (i.e. structure, unstructured, or assembled). A rule element further allows one or more <Action> elements to be defined as well as conditions to determine when to use a specific action or the default action for the specified data type. An action element references the name of an action that is defined in the CMS configuration. In the example herein, rule 1420 indicates that the UnstructuredEditAction should always be used when the rule is matched. For the other rules in rule group 1410, namely rules 1430, no specific actions are defined. In these cases the default action corresponding with the specified data type will be used. Also, when the rendering mechanism applies the rendering rules 1400, the rendering markers for rules 1430 will be nested under the rendering marker for rule 1420. The <Default> element 1440 in this example depicts a default case. The <Default> element 1440 allows a system administrator to indicate what the default data type should be for the object. In other words, when none of the rendering rules 1400 apply to the object, the default type should be used.

A sample data mapping 1500 is shown in FIG. 15. Data mapping configuration 1500 depicts default associations between different types of data and rendering actions. The configuration is used by the CMS to determine which actions to render a particular type of data when no actions are explicitly specified by a rendering rule. Note that rendering rules 1400 and data mapping 1500 are preferably part of the rendering rules 188 shown in FIG. 1.

FIGS. 16-17 show how the document shown in FIGS. 12-13 is changed after the CMS scans the document and applies rendering rules 1400. A rendering marker is added to the beginning of the object to indicate what the default rendering actions are. In the current example, rendering marker 1610 corresponds to the <Default> rule from rendering rules 1400. By inserting rendering marker 1610 at the top of the object, the rending mechanism knows that any element in the object that does not have an explicit rendering action associated with it should use the default definition in rendering marker 1610. Rendering marker 1710 in FIG. 17 is defined within the <section> element, and is associated with the UnstructuredEditAction as defined by rendering rules 1400. Rendering markers 1720, 1730, and 1740 indicate to use the StructuredEditAction rendering action. Rendering markers 1720, 1730, and 1740 are nested below the UnstructuredEditAction rendering marker, and therefore will not be rendered to the user initially, but will be rendered after the user has started editing the <section> element in the unstructured data application. The user will see an option in the unstructured data application for invoking the structured data application to view the subsequent structured sections. In this manner, multiple applications may be active at the same time rendering different elements or nested elements to the user.

Figure 18:
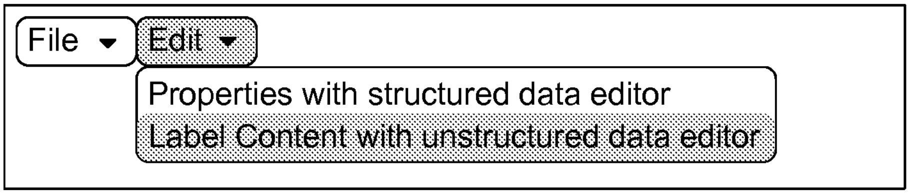
FIG. 18 shows one suitable example of a user interface that allows a user to specify a desired rendering action.

A user interface may be included that allows a user to select a desired rendering action. FIG. 18 shows one possible user interface the user might see if the user selected the example XML document shown in FIGS. 12-13 with rendering rules 1400 applied. If the user chooses the "Properties with structured data editor" action under the Edit menu, then the rendering mechanism will call the action, which in this example launches a structured data editor. All of the XML elements that have rendering markers corresponding to structured data are passed to the structured data editor. Since structured data editor is the default association, all elements from the sample document that do not contain a specific rendering marker and all those that contain a rendering marker corresponding to the structured data editor will be rendered. If the user chooses the "Label Content with unstructured data editor" action under the Edit menu, as shown in FIG. 18, then the rendering mechanism launches an unstructured data editor. All of the XML elements from the sample document that have rendering markers corresponding to unstructured data are passed to the unstructured data editor.

Figure 19:
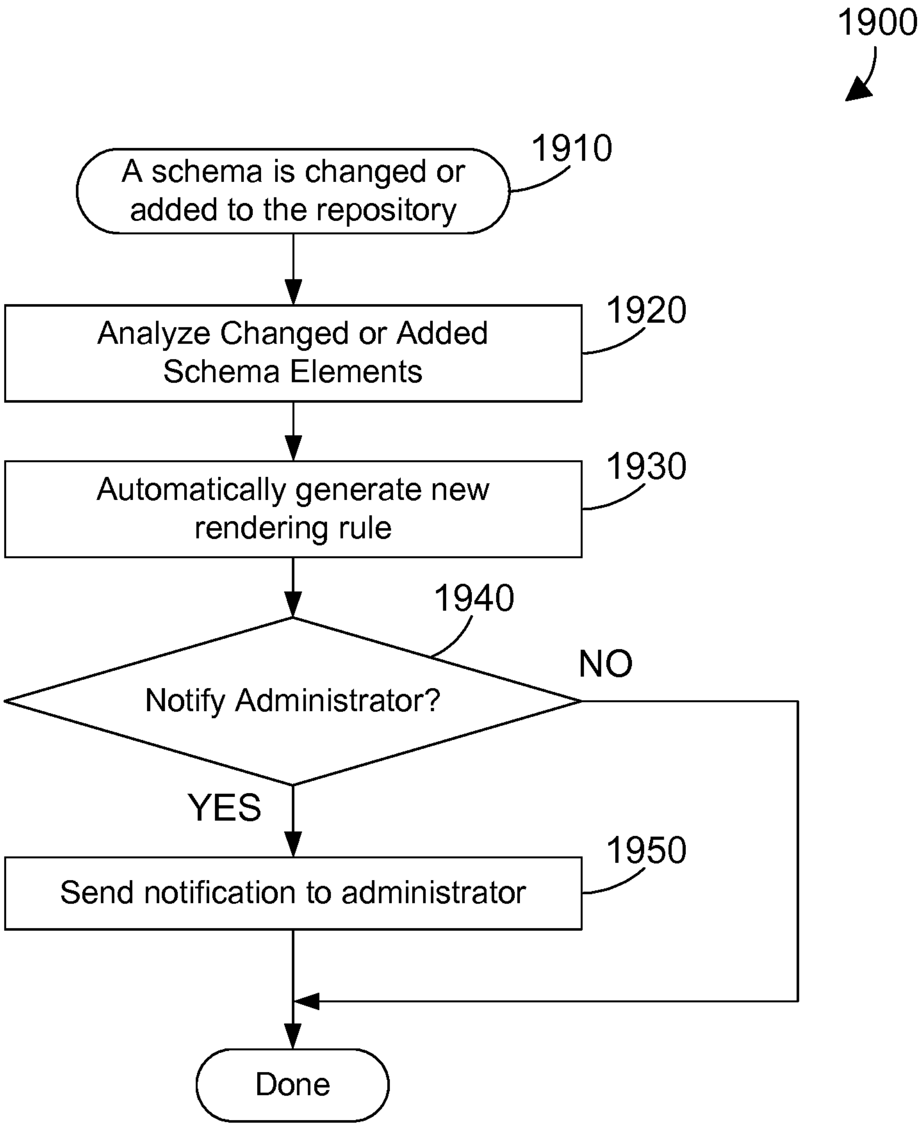
FIG. 19 is a flow diagram of a method for automatically generating one or more new rendering rules when a schema is changed or added to the repository.

Referring to FIG. 19, a method 1900 shows how rendering rule generation mechanism 174 in FIG. 1 autonomically generates new rendering rules when a schema is changed or added. Method 1900 begins with a schema being changed or added to the repository (step 1910). The changed or added schema elements are added (step 1920). A new rendering rule may then be generated automatically (step 1930). If the system administrator is to be notified (step 1940=YES), notification is sent to the administrator (step 1950). If no notification is needed (step 1940=NO), method 1900 is done. By autonomically generating a new rendering rule based on a new or changed schema, the content management system 170 makes dynamic modifications to its rendering rules 188 that allow the system to function without requiring a system administrator to explicitly define a new rendering rule for new or changed schemas.

Method 1900 may be implemented in any suitable way. For example, rendering rules could be periodically analyzed by the content management system, and patterns corresponding to the rendering rules could be stored in a database. A new rendering rule could then be generated based on the stored patterns in the database. In addition, any suitable enhancement could be added to the autonomic generation of rendering rules. For example, a rule generation control could be specified to turn autonomic generation of rendering rules on and off, and a rule generation threshold could be defined that allows autonomic generation of rules in some circumstances while prohibiting autonomic generation of rules in other circumstances. These and other enhancements are within the scope of the disclosure and claims herein.

Because the rendering mechanism disclosed and claimed herein can route elements to appropriate applications, the rendering mechanism can invoke multiple applications at the same time and display their outputs in a convenient manner. An example of this is shown in FIG. 20. We assume display panel 2000 is defined by a graphical user interface, and within display panel 2000 are multiple windows 2010, 2020, 2030, 2040 and 2050. In this specific example, window 2010 displays structured data that is output from a corresponding application for structured data. Window 2020 displays unstructured data that is output from a corresponding application for unstructured data. Window 2030 displays structured data that is output from a corresponding application for structured data. Note the application for structured data display 2030 could be the same application as for structured data display 2010, or could be a different instance as the same application. Window 2040 displays assembly data that is output from a corresponding application for assembly data. Window 2050 displays structured data that is output from a corresponding application for structured data. Again, the application for the structured data display 2050 could be the same application as for structured data displays 2010 and 2030, or could be a different instance of one of these applications. Display 2000 illustrates how multiple applications that are active at the same time may render their outputs to a user in a way that allows the user to view all the content in an object using applications that are optimized for the various different types of content.

While some of the examples discussed herein relate to users and the rendering of objects and elements to a user in various applications, the disclosure and claims herein expressly extend to rendering objects and elements to software processes as well. Thus, the rendering of objects and elements discussed herein expressly extends to rendering the objects and elements to any suitable consumer of the objects and elements, including without limitation human users and software processes.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future. In addition, while the disclosure and claims herein disclose inserting rendering markers inside of elements in an object, an equivalent implementation could place markers surrounding elements in an object. This and other equivalent implementations are within the scope of the disclosure and claims herein.

What is claimed is:

1. An apparatus comprising:

at least one processor;

a memory coupled to the at least one processor;

a repository residing in the memory that includes a plurality of objects;

a plurality of rendering rules residing in the memory that determine how elements in the plurality of objects are rendered;

a content management system residing in the memory and executed by the at least one processor, the content management system comprising:

a rendering mechanism that inserts a plurality of rendering markers in a plurality of elements in a selected object in the repository that identify a corresponding rendering action for each marked element, receives a desired rendering action for the selected object in the repository, determines from the rendering rules and the plurality of rendering markers which of the plurality of elements in the selected object correspond to the desired rendering action, determines which one of a plurality of applications corresponds to the desired rendering action, and renders at least one element in the selected object that corresponds to the desired rendering action in the one application corresponding to the desired rendering action, wherein the rendering mechanism invokes a plurality of applications that are active at the same time to render multiple elements in the selected object that correspond to different rendering actions according to the plurality of rendering markers in the selected object.

2. The apparatus of claim 1 further comprising a rendering rule generation mechanism that generates the plurality of rendering rules by analyzing a schema for the selected object.

3. The apparatus of claim 1 wherein if there are nested elements in the selected object, the rendering mechanism determines from the plurality of rendering rules how to render each nested element.

4. The apparatus of claim 1 wherein if there are nested elements in the selected object, a client rendering mechanism determines from the plurality of rendering rules how to render each nested element in a client computer system coupled to the apparatus.

5. A computer-implemented method for processing objects in a repository in a content management system, the method comprising the steps of:

inserting a plurality of rendering markers in a plurality of elements in a selected object in the repository, the plurality of rendering markers identifying a corresponding rendering action for each marked element in the selected object;

receiving a desired rendering action for the selected object in the repository;

determining from a plurality of rendering rules and from the plurality of rendering markers which of the plurality of elements in the selected object correspond to the desired rendering action;

determining which one of a plurality of applications corresponds to the desired rendering action;

determining from the rendering markers in the selected object how each element in the selected object is rendered; and rendering multiple elements in the selected object by invoking a plurality of applications that are active at the same time to render the multiple elements in the selected object that correspond to different rendering actions according to the plurality of rendering markers in the selected object.

6. The method of claim 5 further comprising the step of automatically generating the plurality of rendering rules by analyzing a schema for the selected object.

7. The method of claim 5 further comprising the step of:

if there are nested elements, determining from the plurality of rendering rules how to render each nested element.

8. The method of claim 7 wherein the step of determining from the plurality of rendering rules how to render each nested element is performed by a rendering mechanism in the content management system.

9. The method of claim 7 wherein the step of determining from the plurality of rendering rules how to render each nested element is performed by a client rendering mechanism on a client computer system.

10. A computer-implemented method for processing objects in a content management system, the method comprising the steps of:

(A) defining a plurality of rendering rules that determine how a plurality of elements in a selected object are rendered to a user in a plurality of applications;

(B) scanning each of the plurality of elements in the selected object, and if a selected element matches one of the plurality of rendering rules, inserting a rendering marker in the selected element in the selected object;

(C) inserting a rendering marker in each nested element in the selected object according to the plurality of rendering rules;

(D) receiving a rendering action from a user for the selected object;

(E) determining a plurality of applications that each correspond to a different rendering action for the selected object;

(F) determining from the rendering markers in the selected object how each element in the selected object is rendered to the user;

(G) invoking multiple applications so they are active at the same time to render a nested element in the selected object that includes markers corresponding to the multiple applications;

(H) determining when a schema in the content management system changes;

(I) automatically generating a new rendering rule corresponding to the changed schema;

(J) determining when a schema is added to the content management system; and (K) automatically generating a plurality of new rendering rules corresponding to the new schema.

* * * * *